(12) United States Patent
Don et al.

(10) Patent No.: US 6,325,186 B1
(45) Date of Patent: Dec. 4, 2001

(54) NEAR-NET SHAPE FABRICATION OF FRICTION DISK RING STRUCTURES

(76) Inventors: Jarlen Don, 25 Mound Ct., Carbondale, IL (US) 62901; Jar-Shuen Don, No. 18 Alley 15, Lane 603, Ding-Jong Rd., Sanming, KaoHsiung; Chia-Yu Tang, 4F No. 2B, 133 Alley, Nan-Ming Street, Shing Ten City, Taipei, both of (TW)

( * ) Notice: Subject to any disclaimer, the term of this patent is extended or adjusted under 35 U.S.C. 154(b) by 0 days.

(21) Appl. No.: 09/542,191

(22) Filed: Apr. 4, 2000

(51) Int. Cl.⁷ .................................................. F16D 65/12
(52) U.S. Cl. .................................. 188/218 XL; 156/157; 188/251 A; 188/73.2
(58) Field of Search ................... 188/218 XL, 251 A, 188/251 M, 251 R, 73.2, 18 A, 73.1, 250 B, 250 G, 250 R, 250 C; 192/107 M, 70.12; 156/148, 204, 227, 259, 182, 157, 266, 184, 304.1; 428/113; 29/419.1

(56) References Cited

U.S. PATENT DOCUMENTS

| | | | |
|---|---|---|---|
| 368,490 | * | 8/1887 | Philion . |
| 2,582,065 | * | 1/1952 | Rasor . |
| 3,552,533 | * | 1/1971 | Nitz et al. ........................ 192/107 M |
| 3,927,241 | * | 12/1975 | Augustin ........................... 188/251 A |
| 4,066,489 | * | 1/1978 | Hannun et al. . |
| 4,262,788 | * | 4/1981 | Yamamoto et al. ............. 188/251 A |
| 4,535,874 | * | 8/1985 | Pollinger et al. .................. 188/73.1 |
| 4,955,123 | * | 9/1990 | Lawton et al. . |
| 5,477,944 | * | 12/1995 | Bryan et al. ..................... 188/250 B |
| 5,546,880 | * | 8/1996 | Ronyak et al. .................. 188/250 C |
| 5,709,288 | * | 1/1998 | Riebe ............................ 188/218 XL |
| 5,823,301 | * | 10/1998 | Bildner et al. . |
| 5,868,888 | * | 2/1999 | Don et al. ............................ 156/157 |
| 6,045,644 | * | 4/2000 | Don et al. ............................ 156/148 |

* cited by examiner

Primary Examiner—Douglas C. Butler
(74) Attorney, Agent, or Firm—Armstrong Teasdale LLP (57) ABSTRACT

A friction disc includes a backing plate and a plurality of tiles having a trapezoid shape. The tiles are cut from a sheet of friction material such that greater than about 80% of the sheet is utilized in the tiles. The tiles are adhered to the backing plate with a phenolic-based resin. A groove extends between adjacent tiles from an inner diameter side to an outer diameter side.

21 Claims, 10 Drawing Sheets

NEAR-NET SHAPE FABRICATION OF FRICTION DISK RING STRUCTURES

BACKGROUND OF THE INVENTION

This invention relates generally to sheet material manipulation and, more particularly, to methods for fabricating friction disc rings.

Clutch and brake assemblies typically used in vehicles, e.g., race cars, air plane landing gear, off-road vehicles, and passenger automobiles, normally include a plurality of alternating friction discs and steel-based opposing plates. Such friction discs are typically fabricated by adhering pre-cut circular discs of friction materials onto steel cores, or steel backing plates, that have the same outer diameter as the pre-cut friction material discs.

These friction disc rings are typically fabricated from "papers" composed of randomly oriented fibers, e.g. KEVLAR® fiber (a poly-para-phenylene terephthalamide fiber commercially available from Dupont, Advanced Fiber Systems, Richmond, Va. 23234), carbon fiber, cellulose fiber, and others, resin binder, recycled materials, and filler, or the disc rings can be made of woven (i.e. nonrandomly oriented) cloth using various fiber materials. The size of these friction disc rings varies from a few inches to a few tens of inches in outer diameter (OD). Due, at least in part, to the fabrication process and raw material cost, carbon-fiber cloth is expensive.

Typical methods of fabricating friction discs suffer from a very low materials utilization rate. That is, there is a high waste of sheet or cloth materials as typically utilized in the field of friction disc fabrication. For example, if 1-ply rings with an inner diameter of 4.175 in. and an outer diameter of 4.98 in. are cut from a rectangular sheet, there will be approximately a 73% waste of material. In the automotive transmission industry, friction paper waste can be as high as about 80%–90%.

Additionally, in wet clutches and brakes, friction discs usually include groove patterns in the surface of the friction materials for the purpose of aiding fluids to flow from an inner diameter side to an outer diameter side of the friction and opposing discs. After bonding friction materials to steel cores, grooving machines are typically used to cut grooves on the surface of the friction discs. The grooving process is an added step, and the groove patterns are often limited to simple geometry.

Accordingly, it would be desirable to provide a method for fabricating a friction disc ring that substantially reduces, or eliminates wasted friction paper or cloth. It also would be desirable if the method for fabricating provided grooves and patterns in the discs without additional fabrication steps.

BRIEF SUMMARY OF THE INVENTION

In an exemplary embodiment, a friction disc is fabricated by cutting a plurality of tiles from a section of friction material sheet. The tiles are adhered to a backing plate such that a groove separates adjacent tiles. The grooves can have substantially any size and shape, since the grooves are defined by the sides of the tiles. The tiles are configured on the section of friction material sheet such that little friction material remains after the tiles are cut from the sheet.

DETAILED DESCRIPTION OF THE INVENTION

Figure 1:
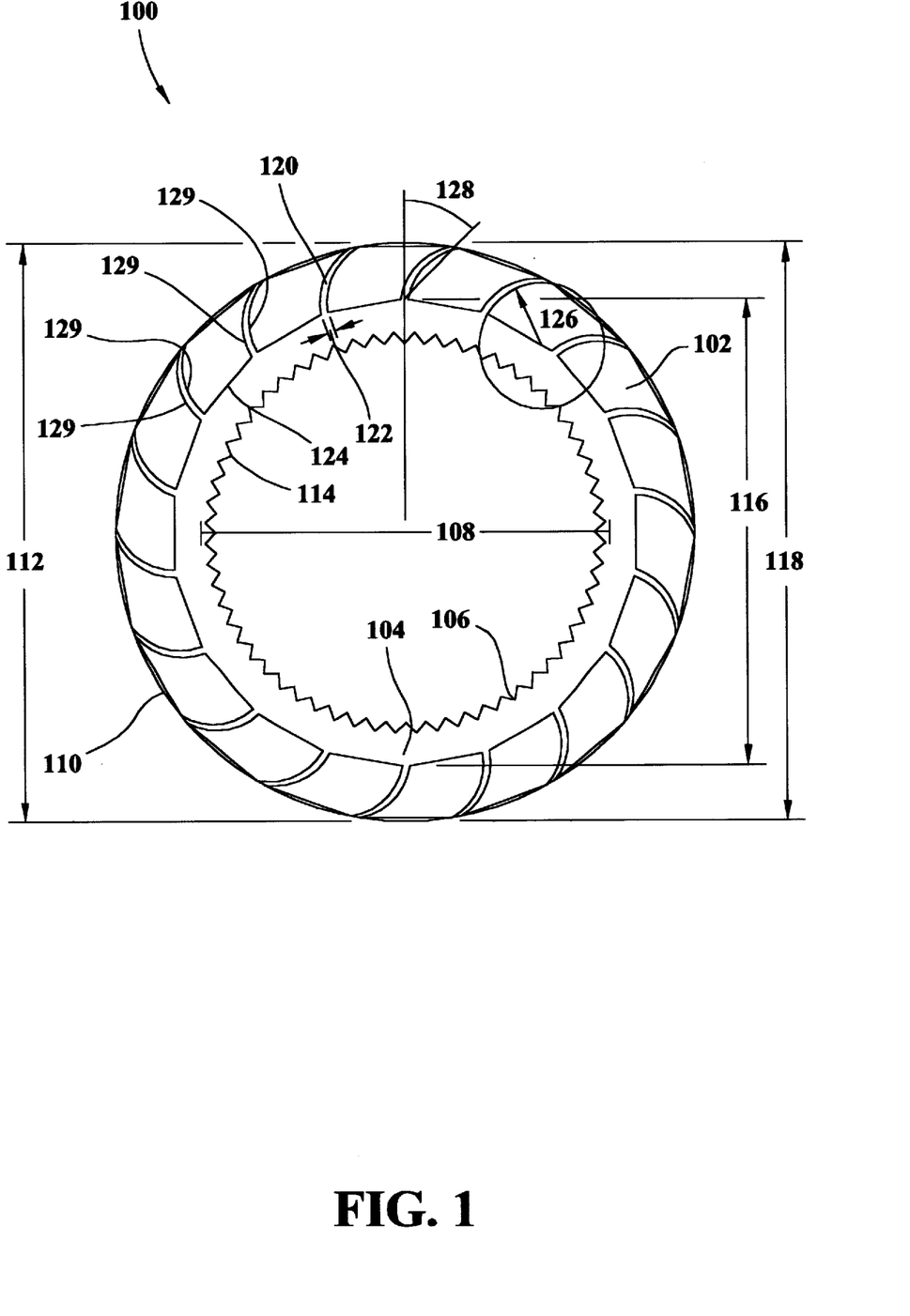
FIG. 1 is an exemplary embodiment of a friction disc.

FIG. 1 is an exemplary embodiment of a friction disc 100 including a plurality of spaced friction trapezoid tiles 102. Disc 100 includes a backing plate 104 having an inner surface 106 having an inner diameter 108 and an outer surface 110 having an outer diameter 112. Inner surface 106 includes a plurality of teeth 114.

Tiles 102 are adhered to disc 100 in a ringed configuration that includes an inner diameter 116 and an outer diameter 118. In one embodiment, tiles 102 are adhered to disc 100 with a phenolic-based resin. Alternatively, other resins could be utilized that provide sufficient adherence between tiles 102 and disc 100. Tile outer diameter 118 is substantially the same as ring outer diameter 112 while tile inner diameter 116 is greater than disc inner diameter 108.

Disc 100 includes a groove 120 between adjacent tiles 102 that, in an exemplary embodiment, has a width 122 of about 10% of a tile base 124 at tile inner diameter 116. Groove 120 has a radius of curvature 126 of about 0.5 inches and has an angle 128, from tile inner diameter 116 to tile outer diameter 118, of about 45 degrees. Groove 120 is defined by a pair of side edges 129 of adjacent tiles 102. In an alternative embodiment, the grooves are straight. In further alternative embodiments, the grooves have a radius of curvature between about one half of side edge 129 and infinity.

Although an exemplary friction disc 100 is illustrated in FIG. 1, it is to be understood that groove width 122 could be varied to alter the performance of friction disc 100. Further, the configuration of grooves 120 could be altered by altering the shape of the tile sides. In addition, radius of curvature 126 could be altered to vary the characteristics of a fluid path from tile inner diameter 116 to tile outer diameter 118. Also, the orientation and number of trapezoid tiles 102 could be varied to alter the number of grooves 120 included in disc 100. For example, although disc 100 includes 18 tiles 102, disc 100 could include less than or more than 18 tiles 102. There would be a corresponding variance in the number of grooves 120 on ring 100 which would effect fluid flow from inner diameter 116 to outer diameter 118.

Figure 2:
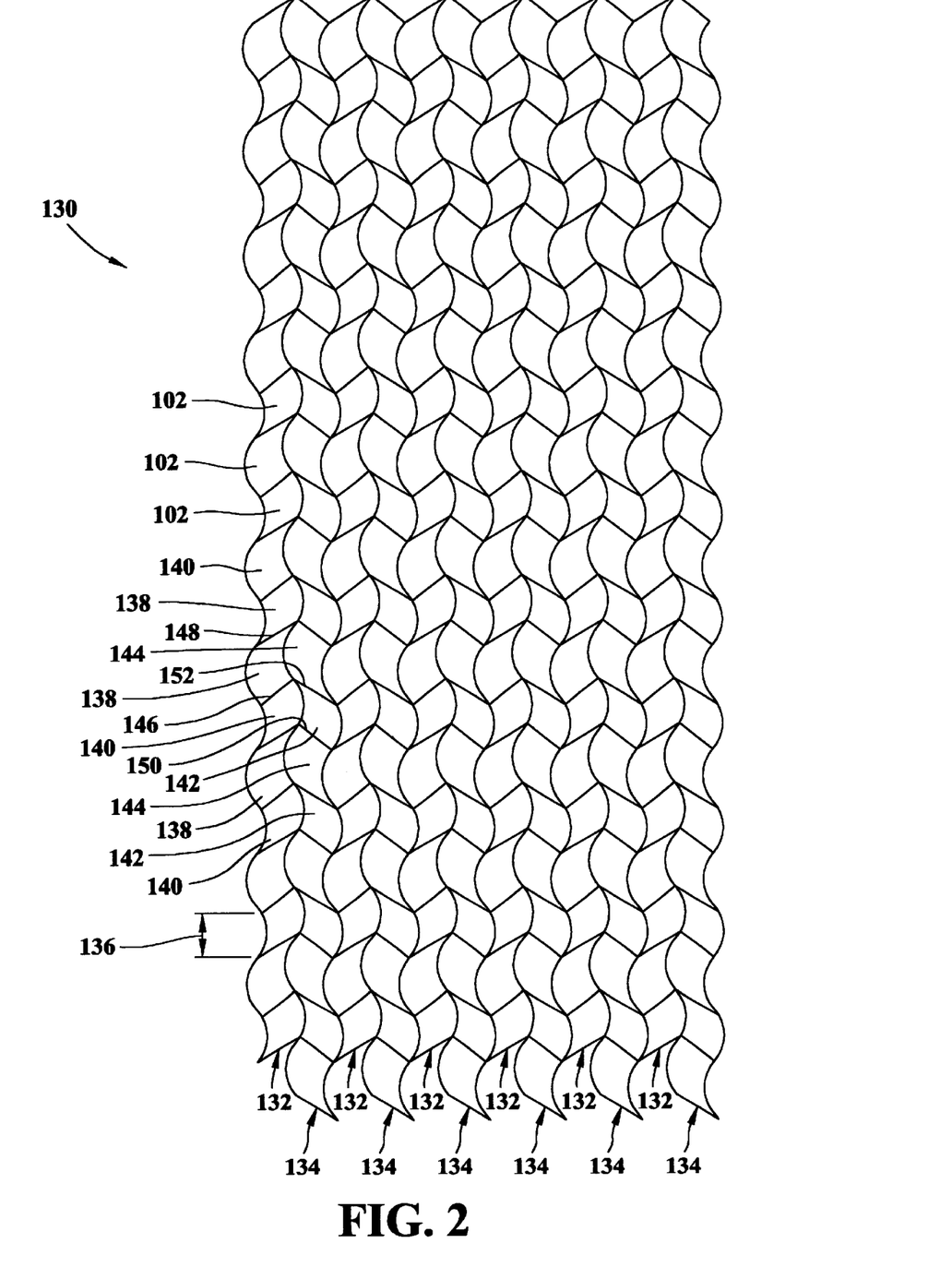
FIG. 2 is a schematic view of a section of material including a plurality of paneled strips.

FIG. 2 is a schematic view of a section 130 of friction material before it has been cut into tiles 102. In one embodiment, the friction material is fabricated from carbon fibers. In alternative embodiments, the friction material is fabricated from KEVLAR® or cellulose fibers as described below in greater detail. Tiles 102 are oriented in paneled strips 132 and 134. Paneled strips 132 alternate with, and are mirror images of, paneled strips 134. In addition, strips 132 are vertically shifted with respect to strips 134 by a distance 136.

Strips 132 include a plurality of first tiles 138 which alternate with, and are rotated 180 degrees with respect to, a plurality of second tiles 140. Strips 134 include a plurality of third tiles 142 which are mirror images of first tiles 138, and a plurality of fourth tiles 144 which are mirror images of second tiles 140. Third tiles 142 alternate with, and are rotated 180 degrees with respect to, fourth tiles 144. Strips 132 and 134 comprise greater than about 80% of section 130 of the friction material. In an alternative embodiment, strips 132 and 134 comprise greater than about 90% of section 130 of the friction material. In a further alternative embodiment, strips 132 and 134 comprise greater than about 95% of section 130 of the friction material.

Tiles 138 and 140 have an inner diameter side 146 and an outer diameter side 148. Tiles 142 and 144 have an inner diameter side 150 and an outer diameter side 152. In one embodiment, inner diameter sides 146 and 150 and outer diameter sides 148 and 152 are straight. In an alternative embodiment, the inner diameter sides and the outer diameter sides are curved and have a radius of curvature substantially equal to one half of tile inner diameter 116 and one half of tile outer diameter 118, respectively.

Figure 3:
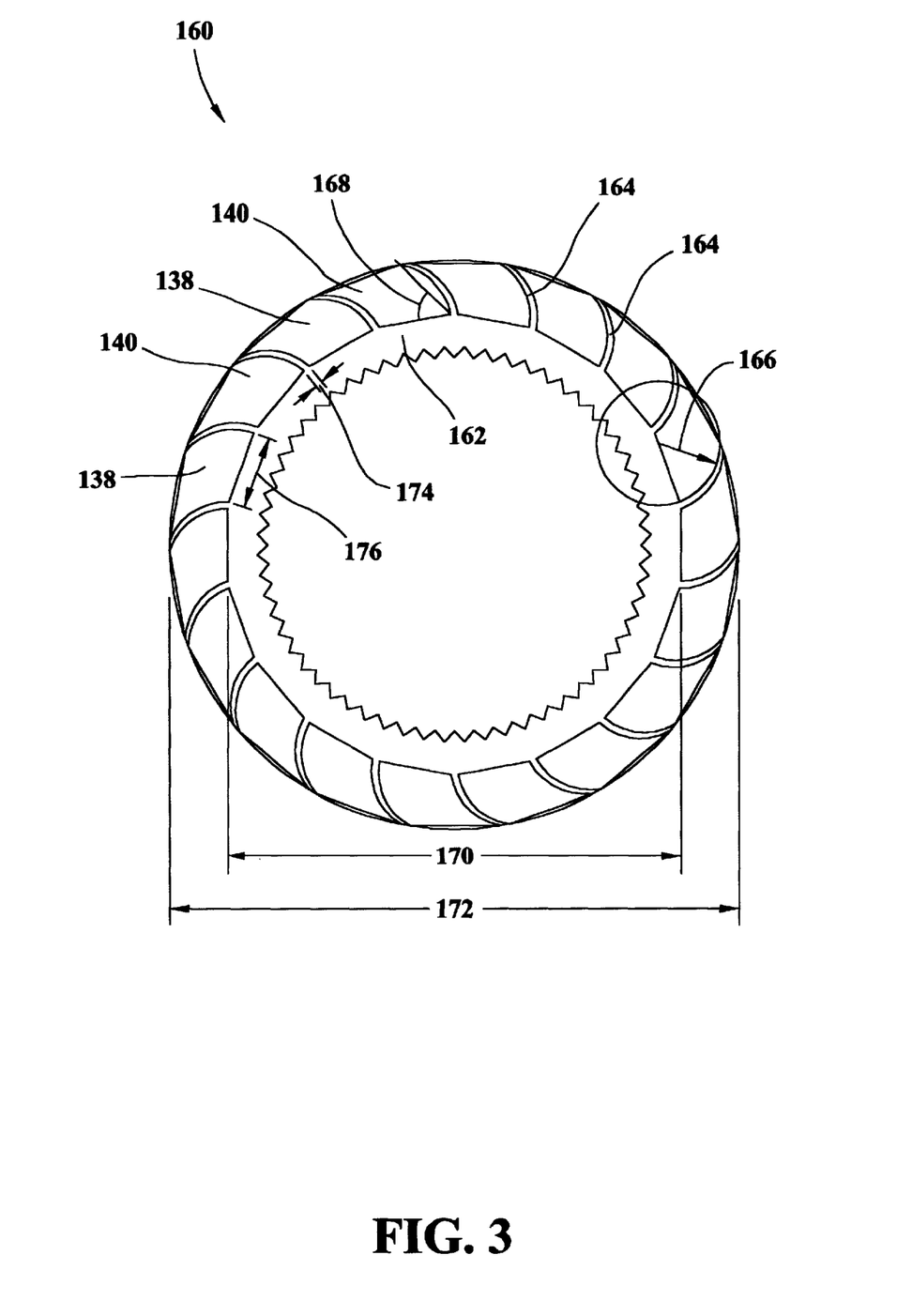
FIG. 3 is a schematic view of an exemplary friction disc.

FIG. 3 is a schematic view of a friction disc 160 including a plurality of tiles 138 and 140 adhered to a backing plate 162. Tiles 138 and 140 are identical and form a plurality of grooves 164. Grooves 164 have a radius of curvature 166 that increases, i.e., has a positive curvature, an angle 168 between grooves 164 and a tile inner diameter 170. Although FIG. 3 illustrates tiles 138 alternating with tiles 140, alternative embodiments of disc 160 include a disc composed solely of tiles 138, solely of tiles 140 and with any combination of tiles 138 and 140. In the particular embodiment shown in FIG. 3, inner diameter 170 is approximately 4.0 inches, a tile outer diameter 172 is approximately 5.0 inches, and radius of curvature 166 is approximately 0.5 inches. In addition, angle 168 is greater than 45 degrees and grooves 164 have a width 174 of about 10% of a tile base width 176.

Figure 4:
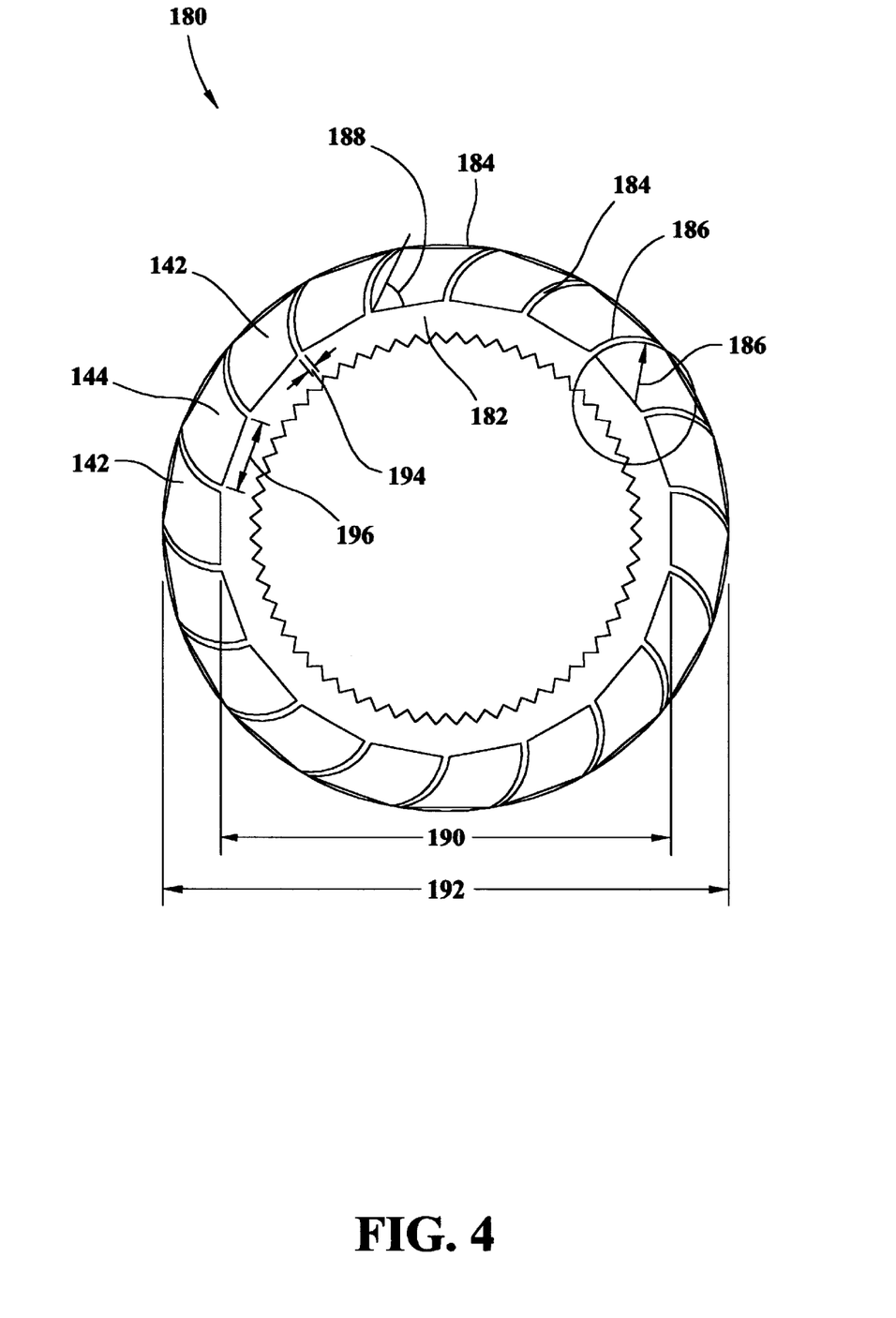
FIG. 4 is a schematic view of an alternative exemplary friction disc complimentary to the friction disc shown in FIG. 3.

FIG. 4 is a schematic view of a friction disc 180 including a plurality of tiles 142 and 144 adhered to a backing plate 182. Tiles 142 and 144 are identical and form a plurality of grooves 184. Grooves 184 have a radius of curvature 186 that increases, i.e., has a positive curvature, an angle 188 between grooves 184 and a tile inner diameter 190. Although FIG. 4 illustrates tiles 142 alternating with tiles 144, alternative embodiments of disc 180 include a disc composed solely of tiles 142, solely of tiles 144 and with any combination of tiles 142 and 144. In the particular embodiment shown in FIG. 4, inner diameter 190 is approximately 4.0 inches, a tile outer diameter 192 is approximately 5.0 inches, and radius of curvature 186 is approximately 0.5 inches. In addition, angle 188 is greater than 45 degrees and grooves 184 have a width 194 of about 10% of a tile base width 196.

Friction disc 160 is a mirror image of friction disc 180. Discs 160 and 180 are assembled, for example, in a clutch pack, so that tiles 138 and 140 contact tiles 142 and 144. In this example, grooves 164 (shown in FIG. 3) have a complimentary configuration with grooves 184.

Figure 5:
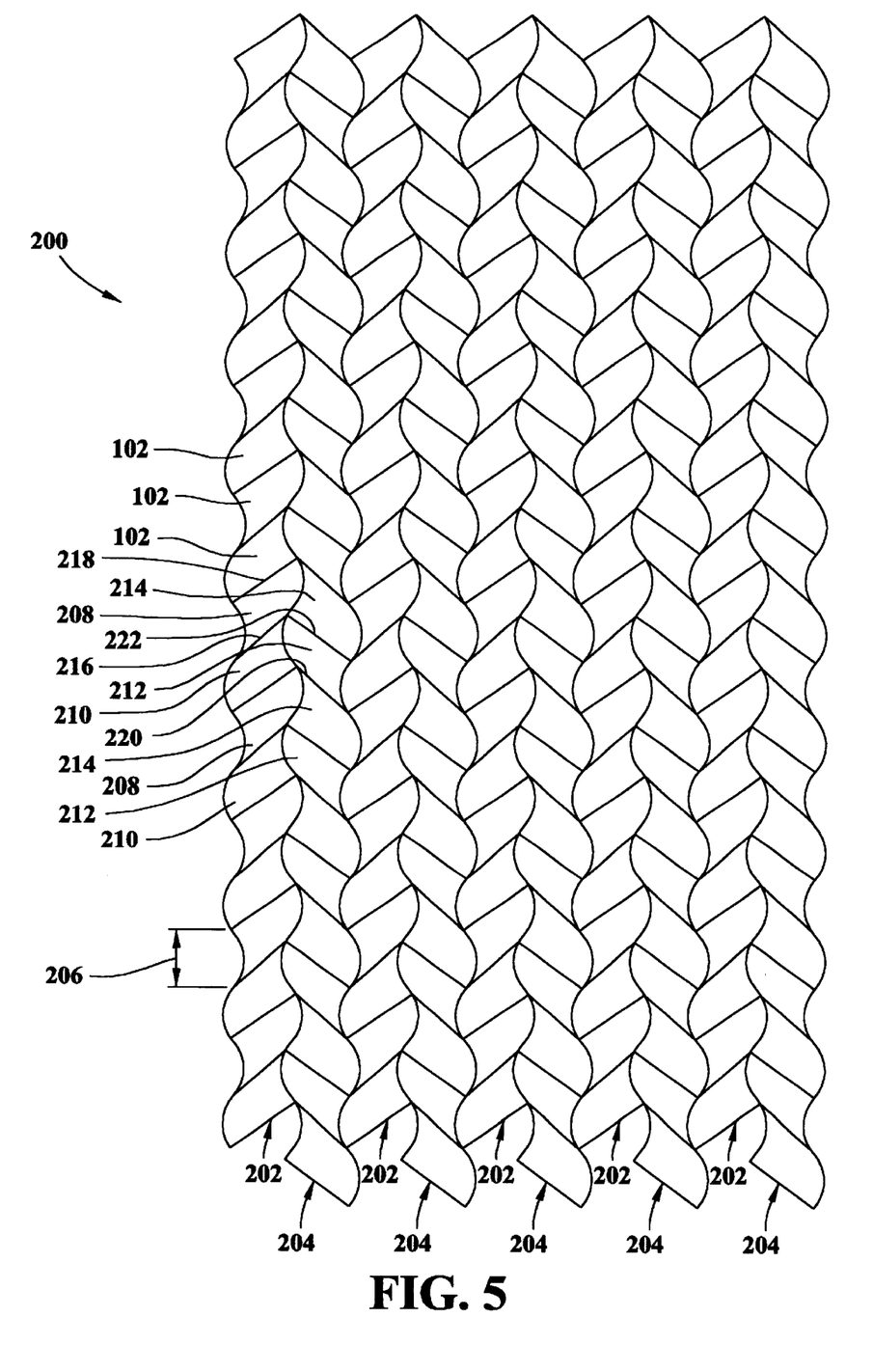
FIG. 5 is a schematic view of an alternative embodiment of a section of material including a plurality of paneled strips.

FIG. 5 is a schematic view of a section 200 of friction material before it has been cut into tiles 102. Tiles 102 are oriented in paneled strips 202 and 204. Paneled strips 202 alternate with, and are mirror images of, paneled strips 204. In addition, strips 202 are vertically shifted with respect to strips 204 by a distance 206. Strips 202 include a plurality of first tiles 208 which alternate with, and are rotated 180 degrees with respect to, a plurality of second tiles 210. Strips 204 include a plurality of third tiles 212 which are mirror images of first tiles 208, and a plurality of fourth tiles 214 which are mirror images of second tiles 210. Third tiles 212 alternate with, and are rotated 180 degrees with respect to, fourth tiles 214.

Tiles 208 and 210 have an inner diameter side 216 and an outer diameter side 218. Tiles 212 and 214 have an inner diameter side 220 and an outer diameter side 222. In one embodiment, inner diameter sides 216 and 220 and outer diameter sides 218 and 222 are straight. In an alternative embodiment, the inner diameter sides and the outer diameter sides are curved and have a radius of curvature substantially equal to one half of a tile inner diameter (not shown in FIG. 5) and one half of a tile outer diameter (not shown in FIG. 5), respectively.

Figure 6:
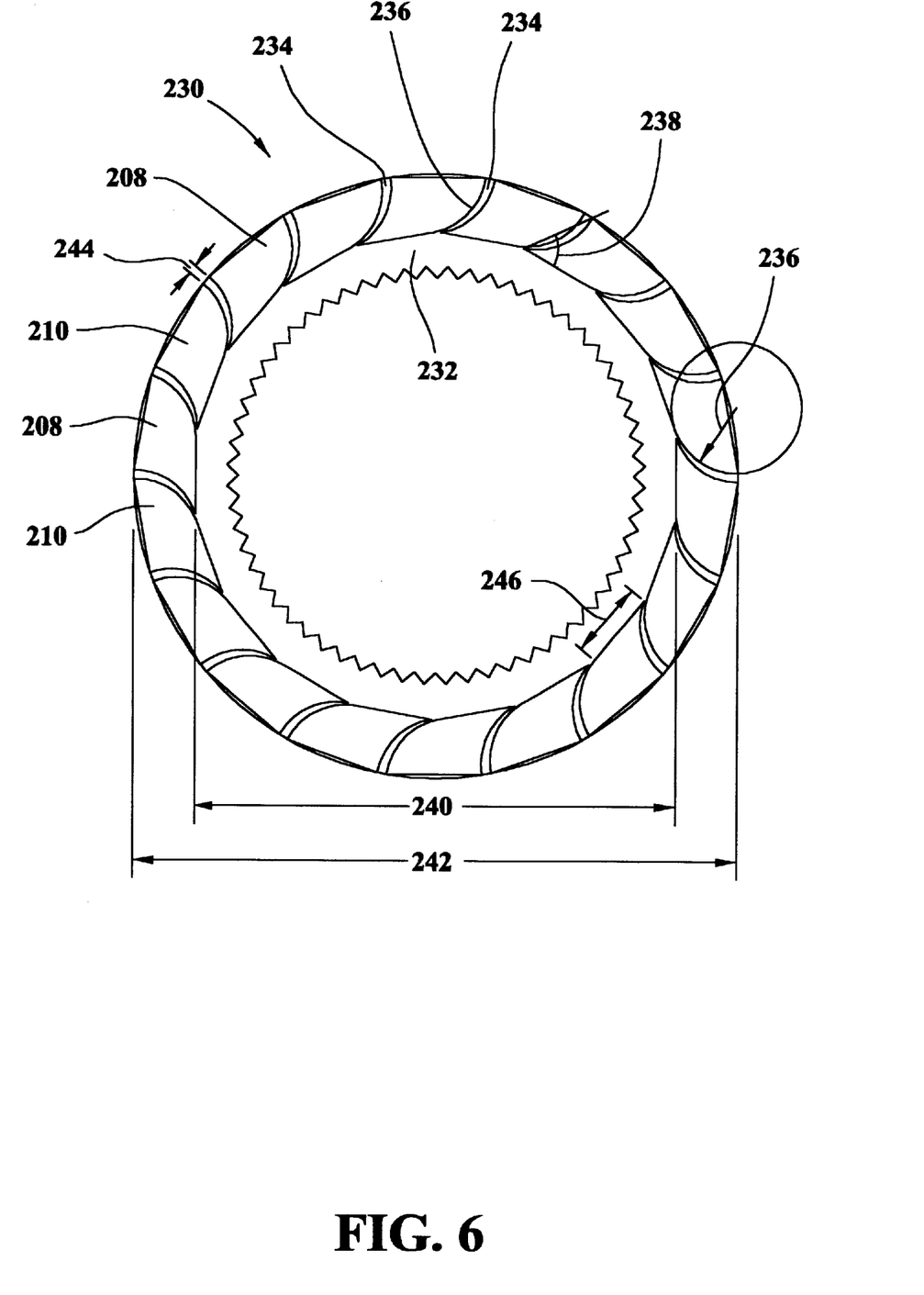
FIG. 6 is a schematic view of a further alternative exemplary friction disc.

FIG. 6 is a schematic view of a friction disc 230 including a plurality of tiles 208 and 210 adhered to a backing plate 232. Tiles 208 and 210 are identical and form a plurality of grooves 234. Grooves 234 have a radius of curvature 236 that decreases, i.e., has a negative curvature, an angle 238 between grooves 234 and a tile inner diameter 240. Although FIG. 6 illustrates tiles 208 alternating with tiles 210, alternative embodiments of disc 230 include a disc composed solely of tiles 208, solely of tiles 210 and with any combination of Tiles 208 and 210. In the particular embodiment shown in FIG. 6, inner diameter 240 is approximately 4.0 inches, a tile outer diameter 242 is approximately 5.0 inches, an d radius of curvature 236 is approximately 0.5 inches. In addition, angle 238 is less than 45 degrees and grooves 234 have a width 244 of about 10% o f a tile base width 246.

Figure 7:
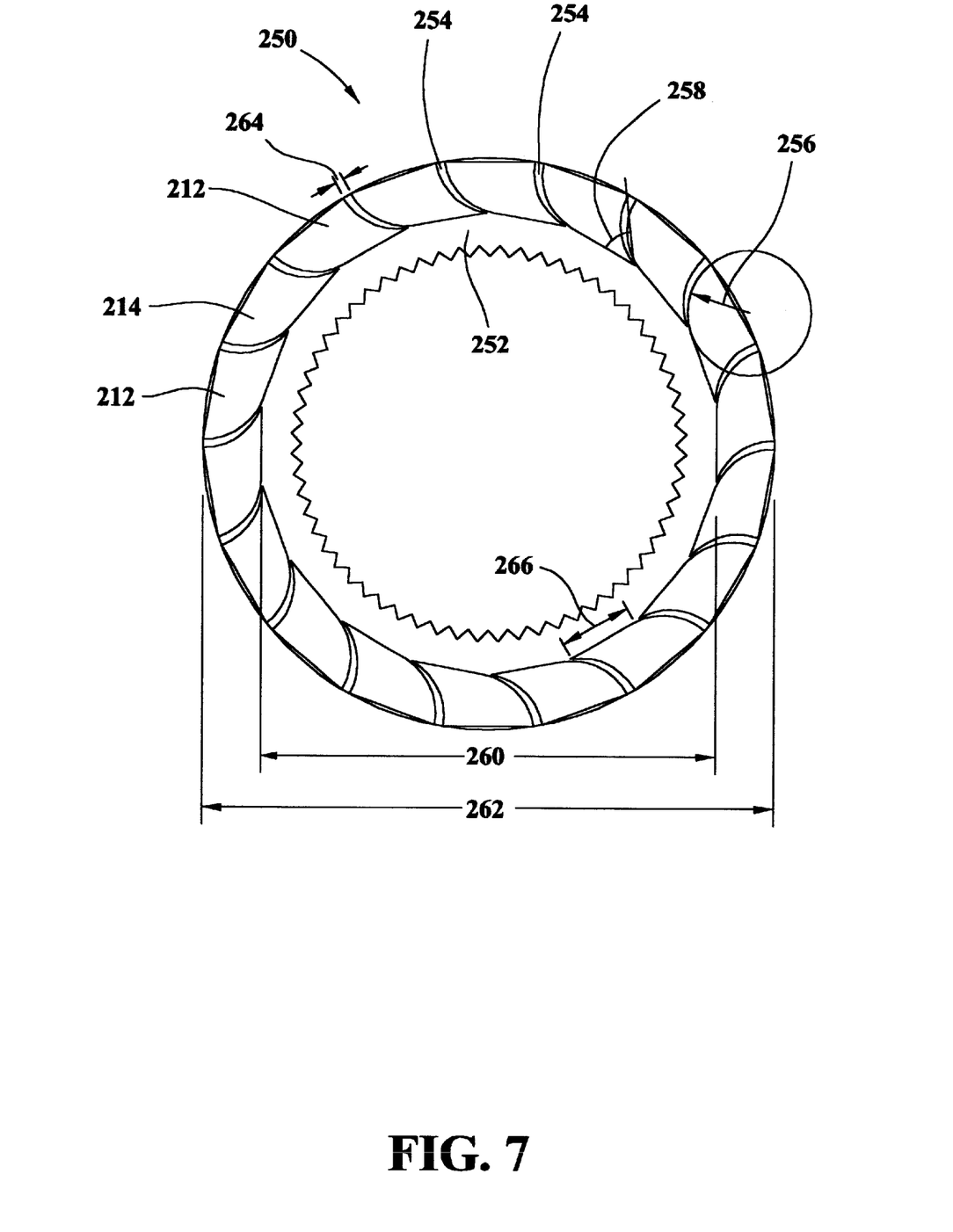
FIG. 7 is a schematic view of an alternative exemplary friction disc complimentary to the friction disc shown in FIG. 6.

FIG. 7 is a schematic view of a friction disc 250 including a plurality of tiles 212 and 214 adhered to a backing plate 252. Tiles 212 and 214 are identical and form a plurality of grooves 254. Grooves 254 have a radius of curvature 256 that decreases, i.e., has a negative curvature, an angle 258 between grooves 254 and a tile inner diameter 260. Although FIG. 7 illustrates tiles 212 alternating with tiles 214, alternative embodiments of disc 250 include a disc composed solely of tiles 212, solely of tiles 214 and with any combination of tiles 212 and 214. In the particular embodiment shown in FIG. 7, inner diameter 260 is approximately 4.0 inches, a tile outer diameter 262 is approximately 5.0 inches, and radius of curvature 256 is approximately 0.5 inches. In addition, angle 258 is about 45 degrees and grooves 254 have a width 264 of about 10% of a tile base width 266.

Friction disc 230 is a mirror image of friction disc 250. Disc s 230 and 250 are assembled, for example, in a clutch pack, so that tiles 208 and 210 (shown in FIG. 6) contact tiles 212 and 214. In this example, grooves 234 (shown in FIG. 6) have a complementary configuration with grooves 254.

Figure 8:
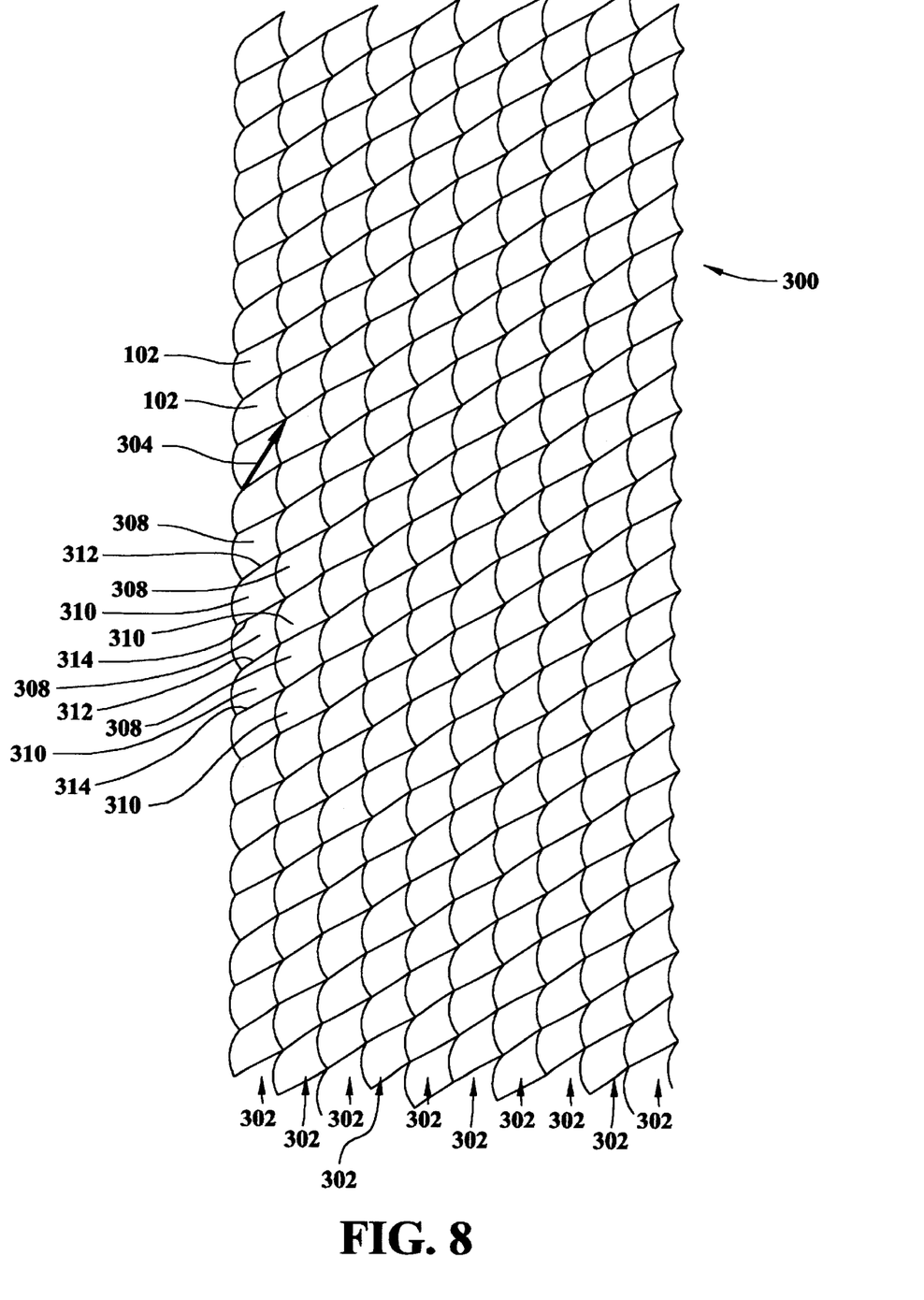
FIG. 8 is a schematic view of a further alternative embodiment of a section of material including a plurality of paneled strips.

FIG. 8 is a schematic view of a section 300 of friction material before it has been cut into tiles 102. Tiles 102 are oriented in paneled strips 302. Paneled strips 302 are shifted by a vector 304. Strips 302 include a plurality of first tiles 308 which alternate with a plurality of second tiles 310. Tiles 308 and 310 have an inner diameter side 312 and an outer diameter side 314. In one embodiment, inner, diameter side 312 and outer diameter side 314 are straight. In an alternative embodiment inner diameter side 312 and outer diameter side 314 are curved and have a radius of curvature substantially equal to one half of a tile inner diameter (not shown in FIG. 8).

Figure 9:
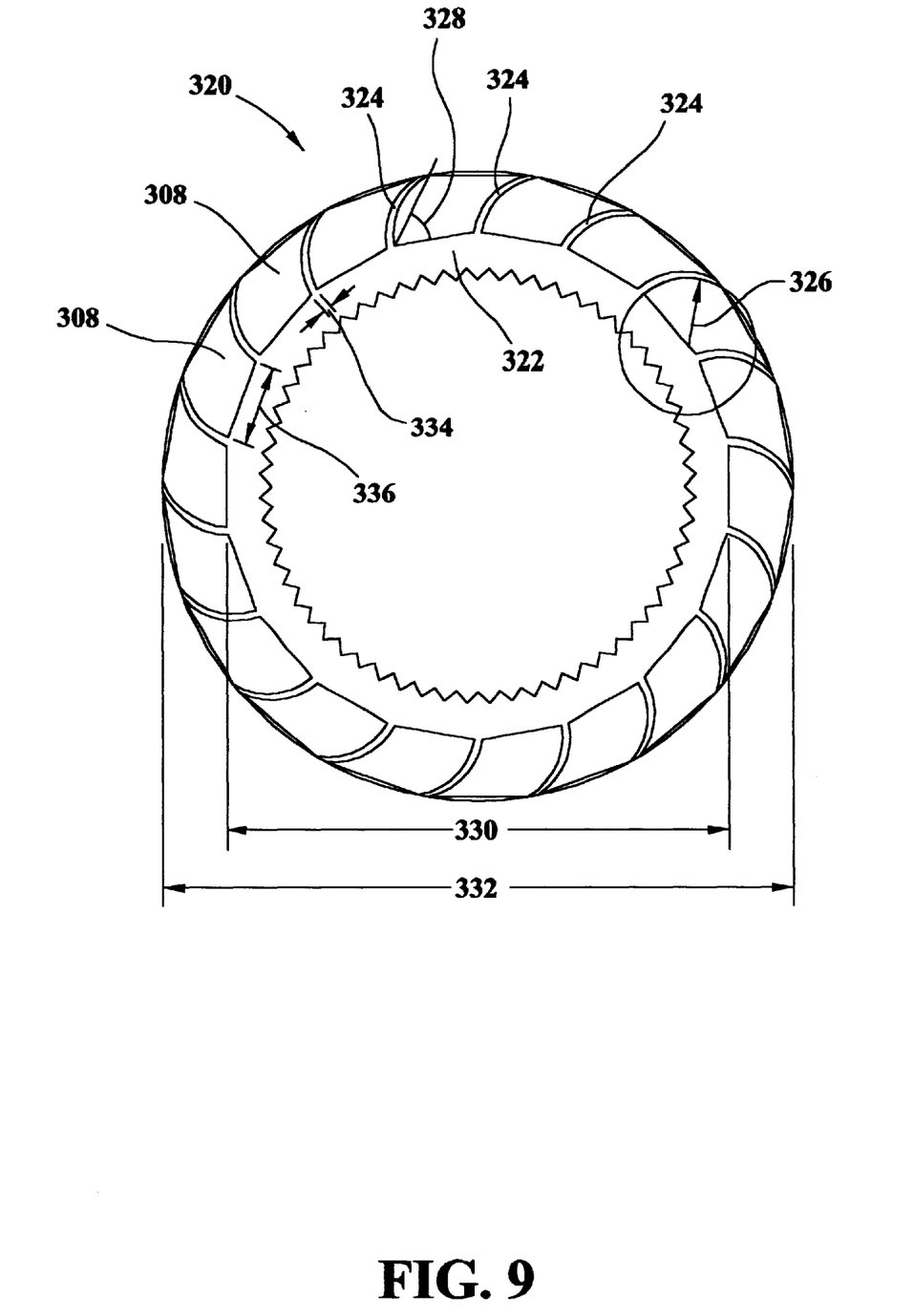
FIG. 9 is a schematic view of a still further alternative exemplary friction disc.

FIG. 9 is a schematic view of a friction disc 320 including a plurality of tiles 308 adhered to a backing plate 322. Tiles 308 form a plurality of grooves 324. Grooves 324 have a radius of curvature 326 that increases, i.e., has a positive curvature, an angle 328 between grooves 324 and a tile inner diameter 330. In the particular embodiment shown in FIG. 9, inner diameter 330 is approximately 4.0 inches, a tile outer diameter 332 is approximately 5.0 inches, and radius of curvature 326 is approximately 0.5 inches. In addition, angle 328 is about 45 degrees and grooves 324 have a width 334 of about 10% of a tile base width 336.

Figure 10:
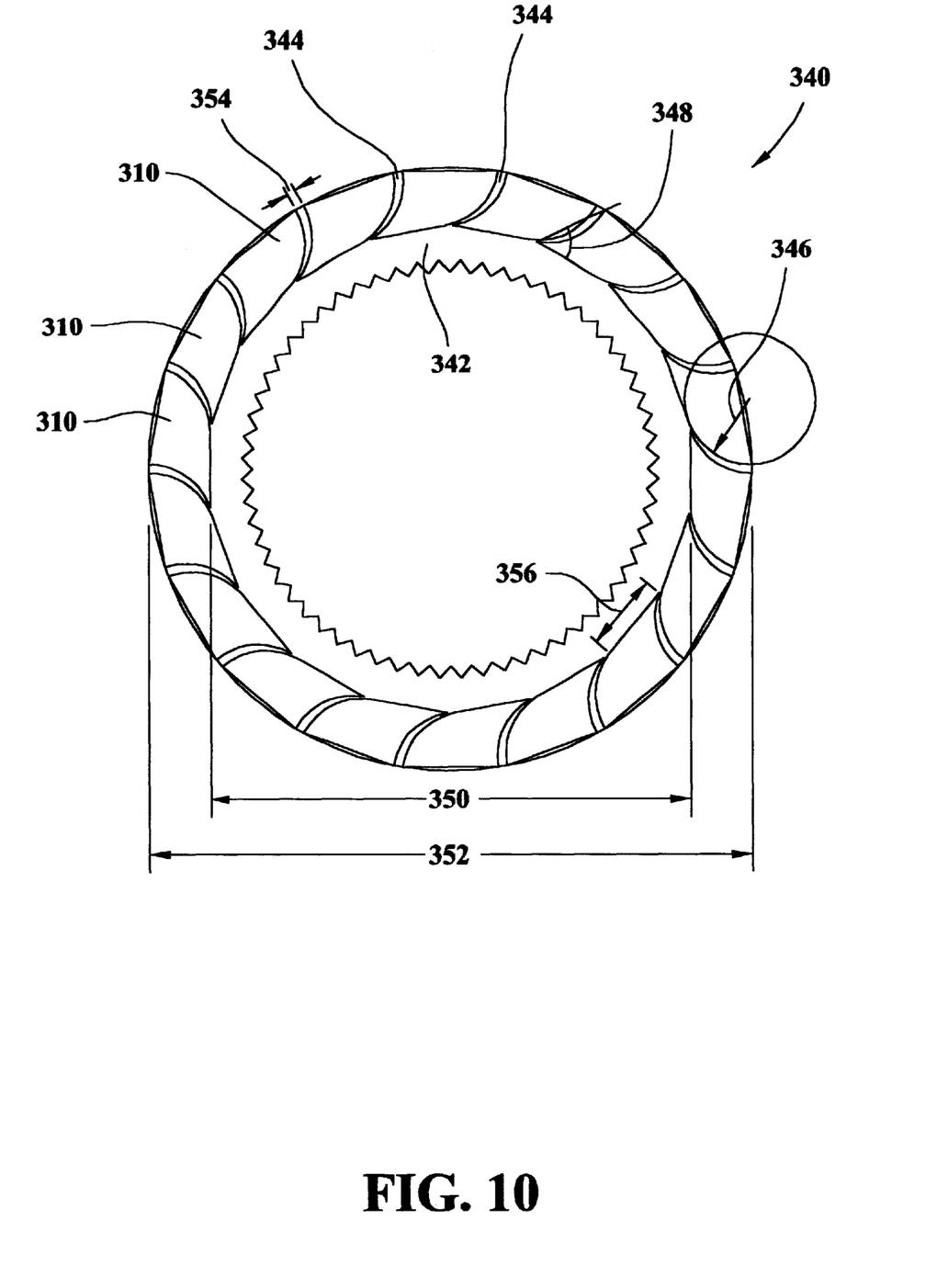
FIG. 10 is a schematic view of an alternative exemplary friction disc complimentary to the friction disc shown in FIG. 9.

FIG. 10 is a schematic view of a friction disc 340 including a plurality of tiles 310 adhered to a backing plate 342. Tiles 310 form a plurality of grooves 344. Grooves 344 have a radius of curvature 346 that decreases, i.e., has a negative curvature, an angle 348 between grooves 344 and a tile inner diameter 350. In the particular embodiment shown in FIG. 10, tile inner diameter 350 is approximately 4.0 inches, tiles 310 have an outer diameter 352 of approximately 5.0 inches, and radius of curvature 346 is approximately 0.5 inches. In addition, angle 348 is less than 45 degrees and grooves 344 have a width 354 of about 10% of a tile base width 356.

A method for fabricating a friction disc, (e.g., friction disc 100 shown in FIG. 1) includes the step of fabricating a sheet of friction material to be used as the friction surface. In one embodiment, the friction material is fabricated from carbon fibers. In alternative embodiments, the friction material is fabricated by mixing KEVLAR® or cellulose fibers with binders and additives. The KEVLAR® or cellulose fibers are then processed into sheets of papers or sheets of fabric. The method further includes the step of creating a pattern of trapezoid tiles on the sheet such that almost the entire sheet of friction material is utilized in the tiles. In one embodiment, greater than about 80% of the sheet is utilized in the tiles. In an alternative embodiment, greater than about 90% of the sheet is utilized in the tiles. In a further alternative embodiment, greater than about 95% of the sheet is utilized in the tiles.

The tiles are then cut from the sheet utilizing a cutting die including a plurality of cutting blades. In an alternative embodiment, the tiles are cut from the sheet utilizing a rolling cutter. The cut tiles are adhered to a backing plate with an adhesive, such as a phenolic-based resin. The tiles are adhered to the backing plate such a groove extends between adjacent tiles from an inner diameter side of the tiles to an outer diameter side of the tiles. The grooves are defined by the shape of the sides of the tiles that connect the inner diameter side to the outer diameter side. The discs, including the friction tiles, are then assembled into clutch assemblies. Alternatively, the discs are assembled into brake assemblies.

While the invention has been described in terms of various specific embodiments, those skilled in the art will recognize that the invention can be practiced with modification within the spirit and scope of the claims.

What is claimed is:

1. A friction disc comprising,
   a backing plate; and
   a plurality of tiles having a trapezoid shape, said tiles adhered to said backing plate.

2. A disc in accordance with claim 1 wherein said tiles comprise a friction material.

3. A disc in accordance with claim 2 wherein said friction material comprises one of carbon and cellulose.

4. A disc in accordance with claim 1 wherein said friction disc comprises a groove between adjacent tiles.

5. A disc in accordance with claim 4 wherein said grooves are defined by a side edge of each adjacent tile.

6. A disc in accordance with claim 1 wherein said tiles are adhered to said backing plate with a phenolic-based resin.

7. A disc in accordance with claim 4 wherein said grooves have a positive radius of curvature.

8. A disc in accordance with claim 4 wherein said grooves have a negative radius of curvature.

9. A disc in accordance with claim 4 wherein said grooves have an angle of about 45 degrees.

10. A disc in accordance with claim 1 wherein said tiles are adhered to said backing plate in a ring configuration, said ring configuration having an inner diameter of about 4.0 inches and an outer diameter of about 5.0 inches.

11. A disc in accordance with claim 1 wherein said tiles have a substantially straight inner diameter side and a substantially straight outer diameter side.

12. A method for fabricating a friction disc including a backing plate, said method comprising the steps of:
    fabricating a sheet of friction material;
    cutting a plurality of trapezoid tiles from the sheet; and
    adhering said trapezoid tiles to the backing plate.

13. A method in accordance with claim 12 wherein said step of fabricating a sheet of material comprises the step of fabricating a sheet of friction material comprising at least one of carbon and cellulose.

14. A method in accordance with claim 12 wherein said step of cutting a plurality of trapezoid tiles comprises the step of cutting a plurality of trapezoid tiles from the sheet such that greater than 80% of the sheet is utilized in the trapezoids.

15. A method in accordance with claim 12 wherein said step of cutting a plurality of trapezoid tiles comprises the step of cutting a plurality of trapezoid tiles having a substantially straight inner diameter side and a substantially straight outer diameter side.

16. A method in accordance with claim 12 wherein said step of adhering said trapezoid tiles comprises the step of adhering the trapezoid tiles to the backing plate with a phenolic-based resin.

17. A method in accordance with claim 12 wherein said step of adhering said trapezoid tiles comprises the step of adhering the trapezoid tiles to the backing plate such that a groove extends between adjacent tiles.

18. A method in accordance with claim 17 wherein said step of adhering the trapezoid tiles to the backing plate such that a groove extends between adjacent tiles comprises the step of adhering the tiles to the backing plate such that a groove having a positive radius of curvature extends between adjacent tiles.

19. A method in accordance with claim 17 wherein said step of adhering the trapezoid tiles to the backing plate such that a groove extends between adjacent tiles comprises the step of adhering, the tiles to the backing plate such that a groove having a negative radius of curvature extends between adjacent tiles.

20. A method in accordance with claim 17 wherein said step of adhering the trapezoid tiles to the backing plate such that a groove extends between adjacent tiles comprises the step of adhering the trapezoid tiles to the backing plate such that a groove having a width equal to about 10% of a width of the trapezoid tiles extends between adjacent tiles.

21. A method in accordance with claim 17 wherein said step of adhering the trapezoid tiles to the backing plate such that a groove extends between adjacent tiles comprises the step of adhering the tiles to the backing plate such that a substantially straight groove extends between adjacent tiles.

\* \* \* \* \*